United States Patent
Feng et al.

(10) Patent No.: US 8,340,167 B2
(45) Date of Patent: Dec. 25, 2012

(54) METHOD AND APPARATUS FOR MEASURING AND CORRECTING RECEIVER PARAMETERS

(75) Inventors: Shen Feng, San Diego, CA (US); Gang Hu, Shanghai (CN); Yuanfei Nie, Shanghai (CN); Meiwu Wu, Shanghai (CN); Yu Chen, Shanghai (CN); Xiaomin Si, San Jose, CA (US); Yiu Leechung, Fremont, CA (US)

(73) Assignee: Montage Technology (Shanghai) Co., Ltd., Shanghai (CN)

( * ) Notice: Subject to any disclaimer, the term of this patent is extended or adjusted under 35 U.S.C. 154(b) by 681 days.

(21) Appl. No.: 12/544,596

(22) Filed: Aug. 20, 2009

(65) Prior Publication Data

US 2011/0026570 A1    Feb. 3, 2011

(30) Foreign Application Priority Data

Jul. 29, 2009    (CN) .......................... 2009 1 0055538

(51) Int. Cl.
*H04B 3/46* (2006.01)
*H04B 17/00* (2006.01)
*H04Q 1/20* (2006.01)

(52) U.S. Cl. ........ 375/226; 375/325; 375/349; 375/350; 455/296

(58) Field of Classification Search .......... 375/224–228, 375/316, 322, 324–325, 340, 346, 349–350; 455/130, 296, 308, 309, 313
See application file for complete search history.

(56) References Cited

U.S. PATENT DOCUMENTS

| | | | |
|---|---|---|---|
| 7,130,359 B2 | 10/2006 | Rahman | |
| 7,148,760 B2 | 12/2006 | Vaananen | |
| 7,158,586 B2 | 1/2007 | Husted | |
| 7,248,625 B2 | 7/2007 | Chien | |
| 7,362,814 B2 | 4/2008 | Sugar | |
| 2003/0206603 A1* | 11/2003 | Husted | 375/324 |
| 2004/0005000 A1* | 1/2004 | Shake et al. | 375/228 |
| 2007/0047634 A1* | 3/2007 | Kang et al. | 375/226 |
| 2007/0123188 A1* | 5/2007 | Mo et al. | 455/302 |

* cited by examiner

*Primary Examiner* — David C. Payne
*Assistant Examiner* — James M Perez
(74) *Attorney, Agent, or Firm* — Jun He Law Offices P.C.; James J. Zhu (57) ABSTRACT

A method and apparatus for measuring parameters of a receiver having a mixer for generating an I signal and a Q signal using an input signal, an I channel circuit for processing the I signal, and a Q channel circuit for processing the Q signal. The method includes feeding the receiver a first testing signal before the mixer. The method includes feeding the receiver a second testing signal on the I channel circuit. The method includes feeding the receiver a third testing signal on the Q channel circuit. The method includes measuring I/Q quadrature deviation and I/Q delay imbalance of the receiver using the first, the second, and the third testing signals. This separates the I/Q quadrature deviation and I/Q delay imbalance.

20 Claims, 4 Drawing Sheets

METHOD AND APPARATUS FOR MEASURING AND CORRECTING RECEIVER PARAMETERS

PRIORITY CLAIM

This application claims the benefit of Chinese patent application number 200910055538.1, filed Jul. 29, 2009, which is incorporated herein by reference in its entirety.

BACKGROUND

Gain deviation, I/Q gain imbalance, I/Q quadrature deviation, and I/Q delay imbalance occur in a receiver of a communication system utilizing quadrature signals. Gain deviation is gain difference between an actual output signal and an ideal output signal caused by gain errors of gain modules in signal path. I/Q gain imbalance is gain difference between an I channel output signal and a Q channel output signal caused by inherent circuit level mismatches between circuits in the quadrature signal paths. I/Q quadrature deviation is an orthogonal degree of an I signal and a Q signal caused by local oscillator signal generation circuit and mixer circuit errors. I/Q delay imbalance is a delay difference between an I channel output signal and a Q channel output signal caused by inherent circuit level mismatches between circuits in the quadrature signal paths. I/Q quadrature deviation and I/Q delay imbalance both result in phase imbalance, and are combined as I/Q phase imbalance. I/Q quadrature deviation and I/Q delay imbalance can not be separated using traditional methods for measuring receiver parameters. But separation of I/Q quadrature deviation and I/Q delay imbalance is of great value to chip design, because if I/Q quadrature deviation and I/Q delay imbalance can be separated, it will be easier to determine chip design modifications i.e., whether to modify the mixer and local oscillator signal generation circuits if I/Q quadrature deviation is high, or to modify the I/Q paths if the I/Q delay imbalance is high, to improve receiver's performance.

In another aspect, outside generated testing signals and inside generated special testing signals (e.g. PN training signal is used to measure receiver parameters as described in the U.S. Pat. No. 7,130,359) are used to measure receiver parameters in traditional technologies. It is not convenient to test a chip with outside generated testing signals because a testing signal generating device and related circuit paths on test board are needed. To measure receiver parameters using inside generated special testing signals, the receiver must include a circuit for generating the signals. Such circuits are relatively complicated, therefore increasing the cost and area of the chip.

In another aspect, gain deviation is corrected by calibrating corresponding gain modules individually in traditional technologies. Unfortunately, this is a complex procedure, and the precision of the result may be not high enough. In addition, this calibration method requires calibration function built in each individual gain module.

Therefore, it is necessary to provide a new method for measuring and correcting receiver parameters to solve the problems mentioned above.

SUMMARY

In one aspect, the present application is related to a method for measuring parameters of a receiver of a communication system.

In another aspect, the present application is related to a receiver of a communication system.

In another aspect, the present application is related to a communication system.

In one aspect, the present application provides a method for measuring parameters of a receiver. The receiver comprises a mixer for generating an I signal and a Q signal using an input signal and a pair of local oscillator signals orthogonal to each other, an I channel circuit for processing the I signal, and a Q channel circuit for processing the Q signal. The method comprises: feeding the receiver a first testing signal before the mixer; feeding the receiver a second testing signal on the I channel circuit; feeding the receiver a third testing signal on the Q channel circuit; and measuring I/Q quadrature deviation and I/Q delay imbalance of the receiver using the first, the second, and the third testing signals. In one embodiment, the method further comprises: sampling on the I channel circuit to obtain a first I signal corresponding to the first testing signal; sampling on the Q channel circuit to obtain a first Q signal corresponding to the first testing signal; sampling on the I channel circuit to obtain a second I signal corresponding to the second testing signal; sampling on the Q channel circuit to obtain a second Q signal corresponding to the third testing signal; measuring the I/Q quadrature deviation and the I/Q delay imbalance using the first I signal, the first Q signal, the second I signal, and the second Q signal.

In one embodiment, the method further comprises: measuring a first I/Q phase imbalance using the first I signal and the first Q signal; measuring a second I/Q phase imbalance using the second I signal and the second Q signal; and calculating the I/Q quadrature deviation and the I/Q delay imbalance using the first and the second I/Q phase imbalance.

In one embodiment, the first I signal, the first Q signal, the second I signal, and the second Q signal are digital signals.

In one embodiment, the I channel circuit comprises a first low pass filter. The first I signal is sampled at a first position on the I channel circuit. The second testing signal is fed at the first position. The Q channel circuit comprises a second low pass filter. The first Q signal is sampled at a second position on the Q channel circuit. The third testing signal is fed at the second position. The position of the first position along the I channel circuit is corresponding to the position of the second position along the Q channel circuit. The second I signal is sampled at the output of the I channel circuit. The second Q signal is sampled at the output of the Q channel circuit.

In one embodiment, the method further comprises: generating the first testing signal using a local generated signal which is used to generate the local oscillator signals; generating the second testing signal using the local generated signal; and generating the third testing signal using the local generated signal. In one embodiment, local oscillator signals are used to generate the I signal and the Q signal.

In one embodiment, the first testing signal is a radio frequency signal, and the second and the third testing signals are baseband signals. A baseband signal is a signal whose frequency is within baseband frequency range.

In one embodiment, the receiver comprises at least one gain module. The method further comprises: measuring step deviation of at least one gain module of the receiver using the first testing signal; and calibrating gain settings of an automatic gain control table according to the step deviation of the at least one gain module to correct gain deviation.

In another aspect, the present application provides a receiver. The receiver comprises a signal path. The signal path comprises: a mixer for generating an I signal and a Q signal using an input signal; an I channel circuit for processing the I signal; and a Q channel circuit for processing the Q signal; a first testing signal generating circuit for generating a first testing signal being connected to the signal path before the mixer; a second testing signal generating circuit for generating a second testing signal being connected to the I channel circuit; and a third testing signal generating circuit for generating a third testing signal being connected to the Q channel circuit.

In one embodiment, the I channel circuit comprises a first low pass filter. The second testing signal generating circuit is connected to the I channel circuit at a first position before the first low pass filter. The Q channel circuit comprises a second low pass filter. The third testing signal generating circuit is connected to the Q channel circuit at a second position before the second low pass filter. The position of the first position along the I channel circuit is corresponding to the position of the second position along the Q channel circuit.

In one embodiment, the receiver further comprises: a first bypass circuit connected to the I channel circuit at the first position; and a second bypass circuit connected to the Q channel circuit at the second position.

In one embodiment, the first testing signal generating circuit generates the first testing signal using a local generated signal which is used to generate a local oscillator signal. The second testing signal generating circuit generates the second testing signal using the local generated signal. The third testing signal generating circuit generates the third testing signal using the local generated signal. In one embodiment, the first testing signal is a radio frequency signal, and the second testing signal and the third testing signal are baseband signals.

In another aspect, the present application provides a communication system. The communication system comprises a receiver and a demodulator. The receiver comprises a signal path. The signal path comprises a mixer for generating an I signal and a Q signal using an input signal, an I channel circuit for processing the I signal, and a Q channel circuit for processing the Q signal. The communication system further comprises: a first testing signal generating circuit for generating a first testing signal being connected to the signal path before the mixer; a second testing signal generating circuit for generating a second testing signal being connected to the I channel circuit; and a third testing signal generating circuit for generating a third testing signal being connected to the Q channel circuit. The demodulator comprises a digital signal processor for measuring I/Q quadrature deviation and I/Q delay imbalance using the first, the second, and the third testing signals in testing mode, and for demodulating in working mode.

In one embodiment, the I channel circuit comprises a first low pass filter. The second testing signal generating circuit is connected to the I channel circuit at a first position before the first low pass filter. The Q channel circuit comprises a second low pass filter. The third testing signal generating circuit is connected to the Q channel circuit at a second position before the second low pass filter. In one embodiment, the communication system further comprises: a first bypass circuit connected to the I channel circuit at the first position; and a second bypass circuit connected to the Q channel circuit at the second position. In one embodiment, the first testing signal generating circuit generates the first testing signal using a local generated signal which is used to generate a local oscillator signal. The second testing signal generating circuit generates the second testing signal using the local generated signal. The third testing signal generating circuit generates the third testing signal using the local generated signal. In one embodiment, the first testing signal is a radio frequency signal, and the second testing signal and the third testing signal are baseband signals.

BRIEF DESCRIPTION OF THE DRAWINGS

The accompanying drawings are included to provide a further understanding of the present application and are incorporated in and constitute a part of this specification. The drawings illustrate the embodiments of the present application and together with the description serve to explain the principles of the application. Other embodiments of the present application and many of the intended advantages of the present application will be readily appreciated, as they become better understood by reference to the following detailed description. The elements of the drawings are not necessarily to scale relative to each other. Like reference numerals designate corresponding similar parts.

DETAILED DESCRIPTION

In the following detailed description, reference is made to various specific embodiments of the invention. These embodiments are described with sufficient detail to enable those skilled in the art to practice the application. It is to be understood that other embodiments may be employed, and that various structural, logical and electrical changes may be made without departing from the spirit or scope of the application.

Figure 1:
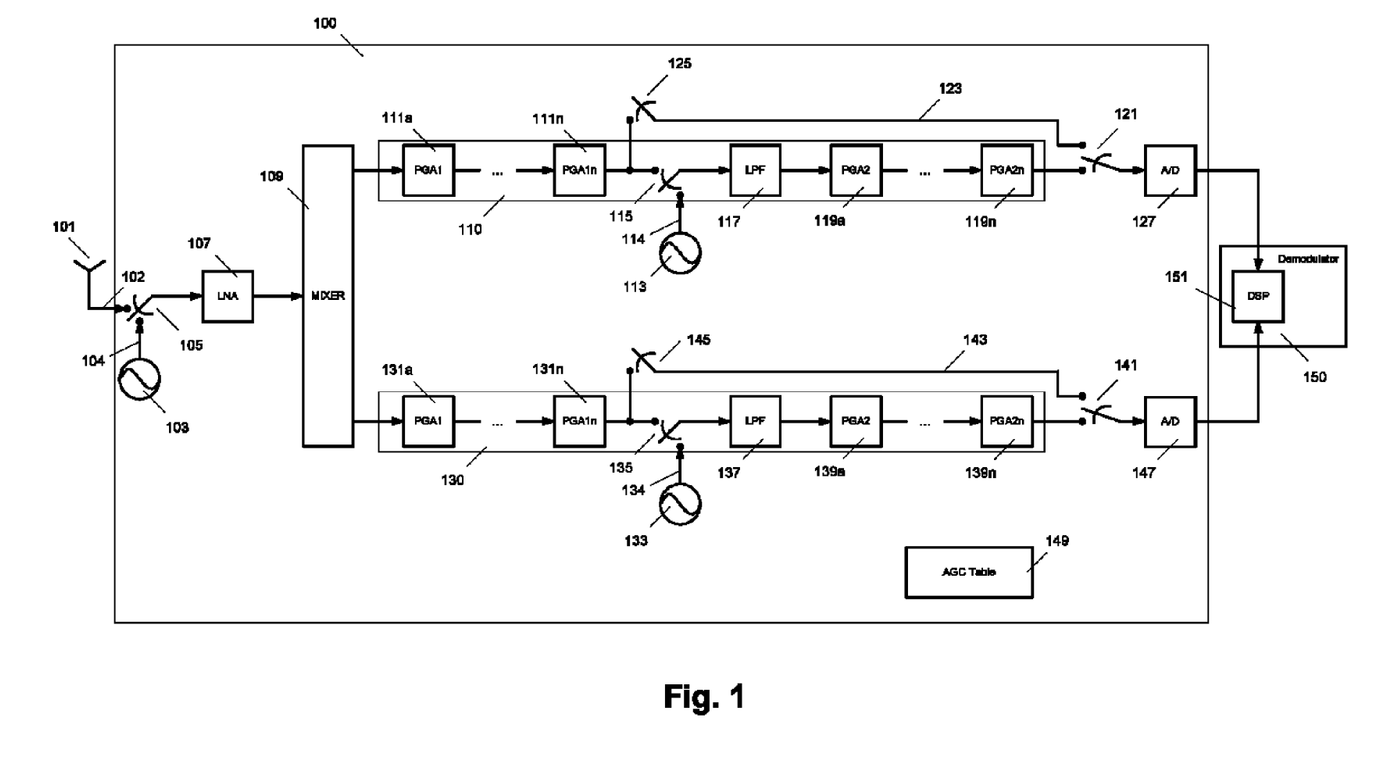
FIG. 1 illustrates a block diagram of a receiver of one embodiment of the present application.

FIG. 1 illustrates a block diagram of a receiver 100 in one embodiment of the present application. Receiver 100 comprises first testing signal generating circuit 103 for generating first testing signal 104, and switch 105. Switch 105 switches between antenna 101 and first testing signal generating circuit 103 to select one of: signal 102 received by antenna 101 and first testing signal 104 as input signal.

Receiver 100 further comprises a low noise amplifier 107 and a mixer 109 connected in series to switch 105. Mixer 109 is for generating an I signal and a Q signal using an input signal.

Receiver 100 further comprises a plurality of programmable amplifiers 111a-111n, switch 115, low pass filter 117, a plurality of programmable amplifiers 119a-119n, and switch 121 connected in series to the in-phase output port of mixer 109. Programmable amplifiers 111a-111n, switch 115, low pass filter 117, and programmable amplifiers 119a-119n form I channel circuit 110.

Receiver 100 further comprises second testing signal generating circuit 113 for generating second testing signal 114. Switch 115 switches between programmable amplifier 111n and second testing signal generating circuit 113 to direct one of: the output signal of programmable amplifier 111n and second testing signal 114 to the rest part of I channel circuit 110.

Receiver 100 further comprises bypass circuit 123 and switch 125. Switch 125 connects programmable amplifier 111n and bypass circuit 123. Switch 121 switches between programmable amplifier 119n and bypass circuit 123 to direct one of: the output signal of programmable amplifier 119n and the output signal of programmable amplifier 111n to analog-to-digital converter 127.

Receiver 100 further comprises a plurality of programmable amplifiers 131a-131n, switch 135, low pass filter 137, a plurality of programmable amplifiers 139a-139n, and switch 141 connected in series to the quadrature-phase output port of mixer 109. Programmable amplifiers 131a-131n, switch 135, low pass filter 137, and programmable amplifiers 139a-139n form Q channel circuit 130.

Receiver 100 further comprises third testing signal generating circuit 133 for generating third testing signal 134. Switch 135 switches between programmable amplifier 131n and third testing signal generating circuit 133 to direct one of: the output signal of programmable amplifier 131n and second testing signal 134 to the rest part of Q channel circuit 130.

Receiver 100 further comprises bypass circuit 143 and switch 145. Switch 145 connects programmable amplifier 131n and bypass circuit 143. Switch 141 switches between programmable amplifier 139n and bypass circuit 143 to direct one of: the output signal of programmable amplifier 139n and the output signal of programmable amplifier 131n to analog-to-digital converter 147. The output of analog-to-digital converter 127 and the output of analog-to-digital converter 147 are connected to digital signal processor 151 of demodulator 150. In one example embodiment, digital signal processor 151 is shared by receiver 100 and demodulator 150 to measure parameters of receiver 100 and to demodulate signals respectively. This arrangement can lower the cost. In another embodiment, receiver 100 may comprise an independent digital signal processor for measuring its parameters.

Receiver 100 further comprises a memory device 149 for storing AGC (automatic gain control) table which stores a plurality of gain settings.

FIG. 1 just illustrates an exemplary block diagram of a receiver for describing method and apparatus for measuring parameters of receiver, it will be appreciated that a receiver in realization may have many else components than that as illustrated in FIG. 1.

When switch 105 switches to antenna 101, switch 115 switches to programmable amplifier 111n, switch 121 switches to programmable amplifier 119n, switch 135 switches to programmable amplifier 131n, and switch 141 switches to programmable amplifier 139n, receiver 100 is in working mode. In working mode, receiver 100 receives signal 102 from antenna 101, amplifies, down converts, separates, and analog-to-digital converts the received signal to obtain a digital I signal and a digital Q signal, and then sends the digital I signal and the digital Q signal corresponding to signal 102 to digital signal processor 151 of demodulator 150 for demodulating.

When switch 105 switches to first testing signal generating circuit 103, switch 115 switches to programmable amplifier 111n, switch 121 switches to programmable amplifier 119n, switch 135 switches to programmable amplifier 131n, and switch 141 switches to programmable amplifier 139n, receiver 100 is in first testing mode. In a first testing mode, receiver 100 receives first testing signal 104, amplifies, down converts, separates, and analog-to-digital converts first testing signal 104 to obtain a digital I signal and a digital Q signal, and then sends the digital I signal and the digital Q signal corresponding to first testing signal 104 to digital signal processor 151 for measuring parameters of receiver 100. In the first testing mode, gain deviation, I/Q phase imbalance, and I/Q gain imbalance can be measured.

When switch 105 switches to first testing signal generating circuit 103, switch 115 switches to programmable amplifier 111n, switch 121 switches to bypass circuit 123, switch 125 closes, switch 135 switches to programmable amplifier 131n, switch 141 switches to bypass circuit 143, and switch 145 closes, receiver 100 is in second testing mode. In a second testing mode, receiver 100 receives first testing signal 104, amplifies, down converts, and separates the received signal to obtain an I signal and a Q signal. The I signal passes programmable amplifiers 111a-111n and bypass circuit 123, then is converted to a digital I signal by analog-to-digital converter 127. The Q signal passes programmable amplifiers 131a-131n and bypass circuit 143, then is converted to a digital Q signal by analog-to-digital converter 147. The digital I signal and the digital Q signal corresponding to first testing signal are then sent to digital signal processor 151 for measuring parameters of receiver 100. In the second testing mode, the sum of I/Q quadrature deviation and a component of I/Q delay imbalance caused by mismatches of programmable amplifiers 111a-111n and programmable amplifiers 131a-131n can be measured. A component of I/Q gain imbalance caused by mismatches of programmable amplifiers 111a-111n and programmable amplifiers 131a-131n can also be measured.

When switch 105 opens, switch 115 switches to second testing signal generating circuit 113, switch 121 switches to programmable amplifier 119n, switch 135 switches to third testing signal generating circuit 133, and switch 141 switches to programmable amplifier 139n, receiver 100 is in third testing mode. Second testing signal 114 is processed by low pass filter 117 and programmable amplifiers 119a-119n, and then is converted to a digital I signal by analog-to-digital converter 127. Third testing signal 134 is processed by low pass filter 137 and programmable amplifiers 139a-139n, and then is converted to a digital Q signal by analog-to-digital converter 147. The digital I signal and the digital Q signal corresponding to second testing signal 114 and third testing signal 134 respectively are sent to digital signal processor 151 for measuring parameters of receiver 100. In a third testing mode, a component of I/Q delay imbalance and a component of I/Q gain imbalance caused by mismatches of the circuit formed by low pass filter 117 and programmable amplifiers 119a-119n, and the circuit formed by low pass filter 137 and programmable amplifiers 139a-139n can be measured.

The I/Q delay imbalance can be caused by mismatches of the part from low pass filter 117 of I channel circuit 110 and the part from low pass filter 137 of Q channel circuit 130. Therefore, the sum of I/Q quadrature deviation and a component of I/Q delay imbalance, caused by mismatches of programmable amplifiers 111a-111n and programmable amplifiers 131a-131n, measured in second testing mode, can be regarded as I/Q quadrature deviation of receiver 100. The I/Q phase imbalance measured in third testing mode can be regarded as I/Q delay imbalance of receiver 100.

In measurement of I/Q imbalance parameters including I/Q quadrature deviation, I/Q delay imbalance, and I/Q gain imbalance, each gain module is set to its highest gain setting because the I/Q quadrature deviation at that time. If the gain of the signal path is too high, to avoid clipping in analog-to-digital conversion, the amplitude of the input signal should be low. This will deteriorate signal to noise ratio and further precision of measurement. If the signal path is divided into two or more parts, and each part is separately measured by bypassing non-measured parts, and sum or weighted sum results are close to actual parameters. In the embodiment illustrated by FIG. 1, bypass circuits 123 and 143 serve for this purpose. Because the maximum gains of low pass filters 117 and 137 are relative high, and their contribution to delay is relative great, bypass circuits 123 and 143 are connected to I channel circuit 110 before low pass filter 117 and Q channel circuit 130 before low pass filter 137 respectively. As a result, the circuit before low pass filters 117 and 137 and the circuits from low pass filters 117 and 137 may be tested separately.

Gain module includes any module that may change signal amplitude, like low noise amplifier, mixer, low pass filter, programmable amplifier etc.

In another embodiment, second testing signal circuit 113 may be connected to I channel circuit 110 between mixer 109 and programmable amplifier 111a, third testing signal circuit 133 may be connected to Q channel circuit 130 between mixer 109 and programmable amplifier 131a. In this arrangement, I/Q quadrature deviation and I/Q delay imbalance can also be separated.

In one embodiment, first testing signal generating circuit 103 generates first testing signal 104 using a local generated signal. In one embodiment, first testing signal 104 is a radio frequency signal.

In one embodiment, second testing signal generating circuit 113 generates second testing signal 114 using a local generated signal, third testing signal generating circuit 133 generates third testing signal 134 using a local generated signal. In one embodiment, second testing signal 114 and third testing signal 134 are baseband signals.

In one embodiment, first testing signal generating circuit 103 generates first testing signal 104 by frequency-dividing and mixing a local generated signal. Second testing signal generating circuit 113 and third testing signal generating circuit 133 generate second testing signal 114 and third testing signal 134 by frequency-dividing a local generated signal.

It will be appreciated that alternative embodiments are possible. For example, I channel circuit 110 and Q channel circuit 130 can be divided into multiple parts, and a corresponding testing signal source can be connected between every adjacent part for testing the parts separately.

Figure 2:
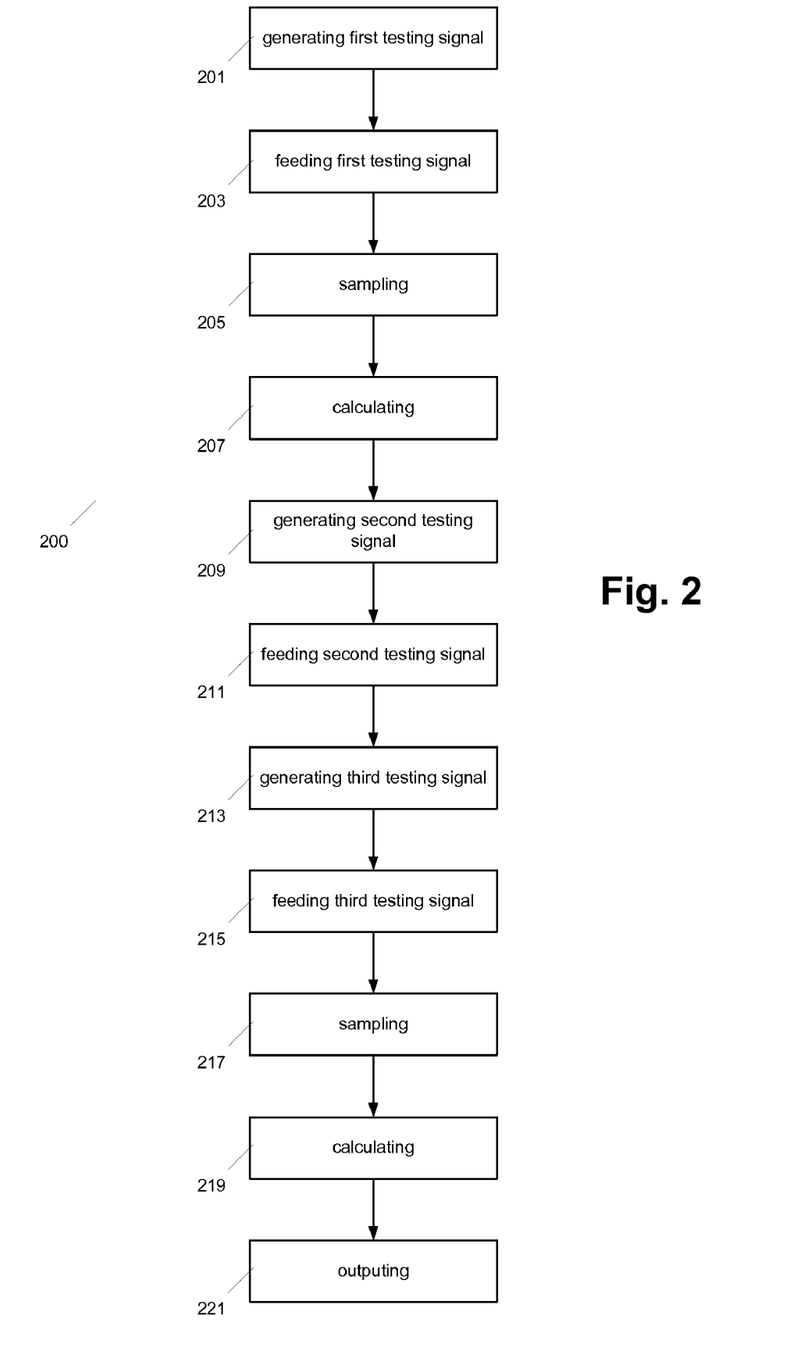
FIG. 2 illustrates a flowchart of a method for measuring parameters of a receiver of one embodiment of the present application.

Referring to FIG. 2, a flow chart of method 200 for measuring parameters of receiver 100 is illustrated. Method 200 includes generating first testing signal 104, which is a radio frequency signal, using a local generated signal (step 201).

Method 200 includes inputting first testing signal 104 to receiver 100 before low noise amplifier 107 (step 203).

Method 200 includes sampling on I channel circuit 110 before low pass filter 117 to obtain a first digital signal corresponding to first testing signal 104, and sampling on Q channel circuit 130 before low pass filter 137 to obtain a second digital signal corresponding to first testing signal 104 (205).

Method 200 includes calculating a first gain imbalance and a I/Q quadrature deviation of receiver 100 using the first digital signal and the second digital signal (step 207).

Method 200 includes generating second testing signal 114, which is a baseband signal, using the local generated signal (step 209); inputting second testing signal 114 to receiver 100 before low pass filter 117 (step 211).

Method 200 includes generating third testing signal 134, which is a baseband signal, using the local generated signal (step 213).

Method 200 includes inputting third testing signal 134 to receiver 100 before low pass filter 137 (step 215).

Method 200 includes sampling at the output of I channel circuit 110 to obtain a third digital signal, and sampling at the output of Q channel circuit 130 to obtain a fourth digital signal (step 217).

Method 200 includes calculating an I/Q delay imbalance and a second gain imbalance of receiver 100 using the third digital signal and the fourth digital signal, and adding the first gain imbalance and the second gain imbalance to obtain an I/Q gain imbalance of receiver 100 (step 219).

Method 200 includes outputting the I/Q quadrature deviation, the I/Q delay imbalance, and the I/Q gain imbalance (step 221).

It will be appreciated that the sequence of method 200 can be modified, for example, second testing signal 114 and third testing signal 134 may be generated and used first instead of first testing signal 104.

In one embodiment, analogue signals may be used to calculate receiver parameters.

The I/Q quadrature deviation is caused by mixer 109 and I/Q delay imbalance is caused by mismatches of I channel circuit 110 and Q channel circuit 130. Therefore, as long as a test is performed using a testing signal input before mixer 109, and a test is performed using two testing signals input on I channel circuit 110 and Q channel circuit 130 respectively, I/Q quadrature deviation and I/Q delay imbalance can be separated. To measure parameters of receiver 100 with each amplifier module being set at its highest gain setting, in one embodiment, the first and second digital signals are sampled before low pass filter 117 and 137 to prevent clipping in analog-to-digital converters 127 and 147. If it is not required to measure parameters of receiver 100 with each amplifier module being set at its highest gain setting, or if dynamic range of analog-to-digital converters 127 and 147 is wide enough, I/Q quadrature deviation and I/Q delay imbalance can be separated using a testing signal input before mixer 109 and two testing signals input after mixer 109 respectively, and in such test no circuit needs to be bypassed.

Calculation of gain deviation and I/Q imbalance parameters will be described below.

Assume first testing signal 104 is r(t), the corresponding I signal is ξ(t), and the corresponding Q signal is ζ(t), then:

$$r_{in}(t) = \xi(t) + j*\zeta(t) \qquad \text{equation (1)}$$

$$\xi(t) = G_i * r(t) * \cos(f_c(t-\tau_1)) \qquad \text{equation (2)}$$

$$\zeta(t) = G_r * r(t) * \sin(f_c(t-\tau_r) + \Delta\phi) \qquad \text{equation (3)}$$

where, $j = \sqrt{-1}$, $G_i$ and $G_r$ are corresponding gains, f is the frequency of a local oscillator signal, $\tau_i$ and $\tau_r$ are corresponding delays, $\Delta\phi$ is I/Q quadrature deviation. $\Delta\tau = \tau_i - \tau_r$, wherein $\Delta\tau$ is delay imbalance.

Equation (1) can be expressed in discrete form as:

$$r_{in}(n) = \xi(n) + j*\zeta(n) \qquad \text{equation (4)}$$

In one embodiment, I/Q gain imbalance and I/Q phase difference is calculated by statistical method as following:

$$\Delta G = G_0 - P(\xi)/P(\zeta) \qquad \text{equation (5)}$$

$$\Delta\phi = \arcsin\left(\sum_i \zeta_i \xi_i \Big/ \sum_i \xi_i^2\right) \approx \sqrt{G_0 - \Delta G} \sum_i \zeta_i \xi_i \Big/ \sum_i \xi_i^2 \qquad \text{equation (6)}$$

where, P(ξ) is the sum of magnitude of the I signal, and P(ζ) is the sum of magnitude of the Q signal, $G_0$ is the ratio of magnitude of the I signal and the Q signal when the I signal and the Q signal are orthogonal to each other strictly, usually $G_0$ is 1, and arcsin is arcsine operator. If a single frequency signal is used as testing signal, when its frequency equals to $f_c \pm f_s/3$, $f_c \pm f_s/6$, $f_c \pm f_s/10$, $\pm f_s/3$, $\pm f_s/6$, or $\pm f_s/10$ etc., statistical method can not be used to measure I/Q gain imbalance, and the precision of the measurement of I/Q phase difference will be low. $f_c$ is frequency of local oscillator signal, and $f_s$ is sampling frequency.

In another embodiment, I signal and Q signal may share the same analogue-to-digital converter. In such situation, a delay of 0.5 sampling interval should be considered in the calculation of receiver's parameters using the digitized I signal and Q signal.

I/Q phase imbalance can also be calculated by calculating phase of each sampling point and averaging phase of the sampling points.

In measurement of I/Q delay imbalance, there is:

$$r_{in}(t) = \xi(t-\tau_i) + j^* \zeta(t-\tau_r) \qquad \text{equation (7)}$$

To measure I/Q delay imbalance, it is preferred that second testing signal 114 and third testing signal 134 have a fixed phase relationship, for example, second testing signal 114 is obtained by shifting the phase of third testing signal 134 by a specified amount, or there is a fixed phase difference between second testing signal 114 and third testing signal 134. In one embodiment, the second testing signal and the third testing signal may be the same signal. Many kinds of signals may be used to measure I/Q delay imbalance, like PN code signals, single frequency signals, and multi-frequency signals etc. It is preferred that the cross-correlation function of each two signals used to measure I/Q delay imbalance is monotone in a low delay space, because the solution of correlative value is unique under such condition. If two signals having a fixed phase difference are used to measure I/Q delay imbalance, the phase difference between the I signal and the Q signal is:

$$\gamma \approx \sqrt{G_0 - \Delta G} \sum_i \varsigma_i \xi_i \Big/ \sum_i \xi_i^2 \qquad \text{equation (8)}$$

The actual phase difference between the two signals can be calculated by searching table or calculating inverse, and the delay imbalance can be obtained by subtracting the fixed phase difference from the actual phase difference.

The measurement of the gain imbalance caused by mismatches of the circuit formed by low pass filter 117 and programmable amplifiers 119a-119n, and the circuit formed by low pass filter 137 and programmable amplifiers 139a-139n is similar to the above.

I/Q quadrature deviation and I/Q delay imbalance combine as I/Q phase imbalance, which can be corrected in demodulator. A corrected signal can be expressed as:

$$r_{new}(n) = \xi_{new}(n) + j^* \zeta_{new}(n) \qquad \text{equation (9)}$$

Since if only one of the I signal and the Q signal is corrected using the I/Q phase imbalance and the I/Q gain imbalance, the I signal and the Q signal can be demodulated correctly. Therefore the corrected signals can be expressed as:

$$\xi_{new}(n) = \xi(n) \qquad \text{equation (10)}$$

$$\zeta_{new}(n) = (G_0 - \Delta G)^* (\xi(n)\cos(\Delta\phi) + \xi(n)\sin(\Delta\phi)) \qquad \text{equation (11)}$$

where, $\Delta\phi = \Delta\phi + f_c^* \Delta\tau$.

Other correction schemes, for example correcting the I signal while remaining the Q signal unchanged, and correcting both the I signal and the Q signal, have the same effect with the correction scheme above except that the complex signals obtained will have phase difference or gain difference from each other, but this will not impact the demodulator's performance.

A statistical method for measuring parameters of a receiver is illustrated above, and an adaptive method for measuring parameters of a receiver will be illustrated below.

First, a reference signal ref(n) is generated locally. The reference signal may be expressed as:

$$\text{ref}(n) = \xi_0(n) + j^* \zeta_0(n) \qquad \text{equation (12)}$$

where, $\xi_0(n)$ and $\zeta_0(n)$ are assumed as the ideal I signal and the ideal Q signal respectively. Because of some non-ideal factors, there will be frequency difference, gain difference, and phase difference between the actual I signal and the ideal I signal, and between the actual Q signal and the ideal Q signal. The signal $\xi_0(n)$ and the signal $\zeta_0(n)$ are used to tracking the differences by comparing with the actual I signal and the actual Q signal respectively. Assume that testing signal is equal to the reference signal, the real part of the I signal may be expressed as:

$$\xi(n) = G_i * (\xi_0 \cos(\phi_i) + \varsigma_0 \sin(\phi_i)) \qquad \text{equation (13)}$$

$$= [A \quad B] \begin{bmatrix} \xi_0 \\ \varsigma_0 \end{bmatrix}$$

where, $$A = G_i \cos(f_c \tau_i) \qquad \text{equation (14)}$$

$$B = G_i \sin(f_c \tau_i) \qquad \text{equation (15)}$$

According to equations (14) and (15), there are:

$$G_i = \sqrt{A^2 + B^2} \qquad \text{equation (16)}$$

$$\phi_i = \arctan(B/A)/f_c \qquad \text{equation (17)}$$

where, arctan is arc tangent function.

Similarly, the imaginary part of the I signal may be expressed as:

$$\xi(n) = [C \quad D] \begin{bmatrix} \xi_0 \\ \varsigma_0 \end{bmatrix} \qquad \text{equation (18)}$$

where, $$C = G_r \sin(\phi_r) \qquad \text{equation (19)}$$

$$D = G_r \cos(\phi_r) \qquad \text{equation (20)}$$

Similarly, $G_r$ and $\tau_r$ can be obtained according to equations (19) and (20). Thus I/Q gain imbalance $\Delta G$ and I/Q phase imbalance $\Delta\phi$ can be obtained:

$$\Delta G = G_0 - G_i / G_r \qquad \text{equation (21)}$$

$$\Delta\phi = \phi_i - \phi_r \qquad \text{equation (22)}$$

Figure 3:
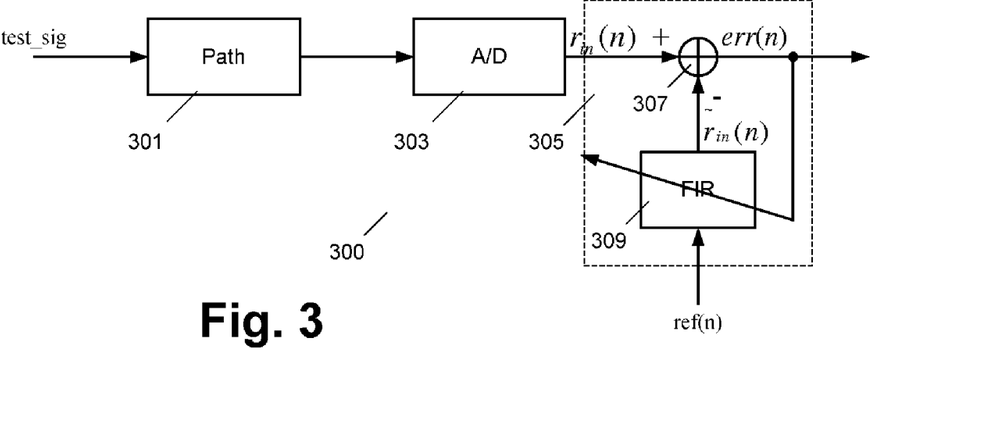
FIG. 3 illustrates a block diagram of a receiver of another embodiment of the present application.

FIG. 3 illustrates a block diagram of receiver 300 of one embodiment of the present application. Receiver 300 comprises signal path 301 including an I channel circuit and a Q channel circuit, analogue-to-digital converter 303, and digital signal processor 305. Digital signal processor 305 comprises adder 305 and FIR filter 309. Testing signal (test_sig) is processed by signal path 301, and then the processed signal is output to analogue-to-digital converter 303. Signal $r_{in}(n)$ is obtained by digitizing the processed signal, and is sent to adder 307. Signal $\tilde{r}_{in}(n)$ is obtained by FIR filter 309 based on error signal err(n) and reference signal ref (n). Then signal $\tilde{r}_{in}(n)$ is sent to adder 307. Error signal err(n) is obtained by calculating the difference between signal $r_{in}(n)$ and signal $\tilde{r}_{in}(n)$ by adder 307, and then error signal err(n) is sent to FIR filter 309 and is used to calculate signal $\tilde{r}_{in}(n)$ in turn.

Disregarding non-ideal factors, conventional LMS method is as following:

$$\tilde{r}_{in}(n) = W(n) * V(\text{ref}(n)) \qquad \text{equation (23)}$$

where, W is weight coefficient, $$V(\text{ref}(n)) = [\text{ref}(n-L)\text{ref}(n) \ldots \text{ref}(n+P-1)] \qquad \text{equation (24)}$$

where, the sum of L and P is modulus of vector.
It may be updated as:

$$\text{err}(n) = r_{in}(n) - \tilde{r}_{in}(n) \qquad \text{equation (25)}$$

$$W(n+1) = W(n) + \lambda * (V(\text{ref}(n)))^{H} * \text{err}(n) \qquad \text{equation (26)}$$

where, $\lambda$ is convergence factor. If the relationship between weight coefficient W and parameters A, B, C, and D is known, weight coefficient W can be calculated using equation (26), and then I/Q gain imbalance and I/Q phase imbalance may be calculated.

Since the precondition of the above LMS method is that the real part and the imaginary part are strictly orthogonal, it can not be used if there is I/Q phase imbalance. To address this problem, the conventional update may be replaced by real number update as:

$$\begin{bmatrix} \tilde{\xi}(n) \\ \tilde{\varsigma}(n) \end{bmatrix} = \begin{bmatrix} \tilde{A}(n) & \tilde{B}(n) \\ \tilde{C}(n) & \tilde{D}(n) \end{bmatrix} \begin{bmatrix} \xi(n) \\ \varsigma(n) \end{bmatrix} \qquad \text{equation (27)}$$

$$\xi_e(n) = \xi_0(n) - \tilde{\xi}(n) \qquad \text{equation (28)}$$

$$\varsigma_e(n) = \varsigma_0(n) - \tilde{\varsigma}(n) \qquad \text{equation (29)}$$

$$[\tilde{A}(n+1) \ \tilde{B}(n+1)] = [\tilde{A}(n) \ \tilde{B}(n)] + \lambda * \xi_e * [\xi(n) \ \varsigma(n)] \qquad \text{equation (30)}$$

$$[\tilde{C}(n+1) \ \tilde{D}(n+1)] = [\tilde{C}(n) \ \tilde{D}(n)] + \lambda * \varsigma_e * [\xi(n) \ \varsigma(n)] \qquad \text{equation (31)}$$

After convergence, there is:

$$\begin{bmatrix} A & B \\ C & D \end{bmatrix} \approx \begin{bmatrix} \tilde{A}(n) & \tilde{B}(n) \\ \tilde{C}(n) & \tilde{D}(n) \end{bmatrix} \qquad \text{equation (32)}$$

As a result, I/Q phase imbalance and I/Q gain imbalance can be calculated using the above method.

For baseband testing signals are input after mixer, I/Q gain imbalance and I/Q delay imbalance can be calculated similarly, but the I/Q delay imbalance may be expressed as:

$$\Delta\tau = \Delta\phi / f_c \qquad \text{equation (33)}$$

Many types of RF testing signals may be used in the method, but to simplify testing signal sources and local signal generators, it is preferable to use simple testing signals like single frequency signals and multi-frequency signals, especially single frequency signals.

Gain of a receiver can be measured by estimating power or magnitude of the signal. Because amplification or attenuation effects of each gain module in the receiver is unknown, it is difficult to measure actual gain of each gain module. In addition, AGC controls gain of the receiver by changing gain setting of the gain modules, in other words, AGC controls gain of the receiver using gain steps of gain modules not the actual gain of gain modules. Therefore, we only need to measure gain step deviation of gain modules. Gain step is gain difference between two adjacent gain settings of a gain module. Gain step deviation is gain difference between an ideal gain step and an actual gain step. In one embodiment, the power or magnitude of the output signal is measured when a gain module is set at a specified gain setting. Then the gain setting of the gain module is changed with the gain settings of other gain modules in the receiver kept unchanged, and measure the power or magnitude of the output signal again. The gain difference between the two gain settings can be obtained by comparing the two measured results. To correct gain deviation and/or gain imbalance, gain differences between different gain settings of main gain modules like low noise amplifier, mixer, low pass filter, and other gain modules having relatively great gain are measured first. Then the settings in the AGC table are revised according to the gain differences measured, thus gain deviation and gain imbalance can be corrected automatically.

Table 1 illustrates an example of an AGC table, where LNA represents low noise amplifier, MIXER represents mixer, $LPF_I$ represents low pass filer in the I channel circuit, $LPF_Q$ represents low pass filter in the Q channel circuit, $PGA_{1I}$ represents the first programmable amplifier in the I channel circuit, $PGA_{1I}$ represents the first programmable amplifier in the Q channel circuit, $PGA_{nI}$ represents the $n^{th}$ programmable amplifier in the I channel circuit, and $PGA_{nQ}$ represents the $n^{th}$ programmable amplifier in the Q channel circuit. Assume the AGC table comprises two settings shown in Table 1, where the gain of setting 1 should be 68 dB, and the gain of setting 2 should be 35 dB. Assume that the measured gain difference between setting 1 and setting 2 of the low noise amplifier is 15 dB, not 16 dB. To ensure the total gain difference between setting 1 and setting 2 of 33 dB, 1 dB gain difference should be compensated. In one embodiment, the gain setting of $PGA_{nI}$ and $PGA_{nQ}$ in setting 1 may be set as 5 dB in place of the original 4 dB to compensate the 1 dB gain difference. In another embodiment, the gain setting of $PGA_{nI}$ and $PGA_{nQ}$ in setting 2 may be set as 2 dB in place of the original 3 dB to compensate the 1 dB gain difference. In general, the gain steps of main gain modules may be measured first, and then the gain settings of corresponding gain modules in corresponding settings of the AGC table may be adjusted according to the measured gain steps to ensure the total gain difference between each two settings of the AGC table is in the range of allowable error.

TABLE 1

|  | LNA | MIXER | $LPF_I$ | $LPF_Q$ | $PGA_{1I}$ | $PGA_{1Q}$ | $PGA_{nI}$ | $PGA_{nQ}$ |
| --- | --- | --- | --- | --- | --- | --- | --- | --- |
| Setting 1 | 32 dB | 16 dB | 8 dB | 8 dB | 8 dB | 8 dB | 4 dB | 4 dB |
| Setting 2 | 16 dB | 8 dB | 4 dB | 4 dB | 4 dB | 4 dB | 3 dB | 3 dB |

It is preferred that the digital signal output by analogue-to-digital converter meets related requirements of effective number bits, signal-to-noise ratio, and DC offset. In one embodiment, to improve the precision of gain measurement, the magnitude of the digital signal may be adjusted to be in a reference voltage range first. In addition, since different gain modules may have different DC offset, to improve measurement precision, before the measurement, the digital signal may be processed to correct DC offset.

The gain relationship between the testing signal and the output signal in log-domain may be expressed as:

$$V_{out} = V_{in} + \sum_{i \in N} G_i \quad \text{equation (34)}$$

Where, N is the number of gain modules in signal path, $G_i$ is the gain of gain module under a specific gain setting, and $V_{in}$ and $V_{out}$, are voltage of the testing signal and the output signal of the signal path respectively.

In one embodiment, the voltage of the testing signal is such that the output signal is effective when the gain module under test is set at the highest gain setting, therefore the inequation (35) below is right.

$$V_{in} + \max\{G_i\} + \sum_{i \in N \& G_i \neq \max\{G_i\}} G_{i0} + \sum_{i \in N} \Delta_{i0} < V_{ref\_max} \quad \text{inequation (35)}$$

Where, $G_{i0}$ is the gain of the $i^{th}$ gain module set at the lowest gain setting, $\Delta_{i0}$ is the greatest possible gain difference between the actual gain and the ideal gain under the setting, and $V_{ref\_max}$ is the maximum value of reference voltage.

In addition, the voltage of the testing signal is such that the output signal is effective when the gain module under test is set at the lowest gain setting, therefore the inequation (36) below is right.

$$V_{in} + \min\{G_i\} + \sum_{i \in N \& G_i \neq \min\{G_i\}} G_{i1} - \sum_{i \in N} \Delta_{i1} > V_{ref\_min} \quad \text{inequation (36)}$$

Where, $G_{i1}$ is the gain of the $i^{th}$ gain module set at the highest gain setting, $\Delta_{i1}$ is the greatest possible gain difference between the actual gain and the ideal gain under the setting, and $V_{ref\_min}$ is the minimum value of reference voltage. $V_{ref\_max}$ and may be set according to parameters of the corresponding analogue-to-digital converter.

Similarly, for measurement of a given group of gain modules, the inequations (37) and (38) below hold true.

$$V_{in} + \sum_{i \in N'} G_i + \sum_{i \in N'} \Delta_i < V_{ref\_max} \quad \text{inequation (37)}$$

$$V_{in} + \sum_{i \in N'} G_i - \sum_{i \in N'} \Delta_i > V_{ref\_min} \quad \text{inequation (38)}$$

Where, N' is the given group of gain modules.

For a specific testing signal and a specified gain setting of the gain module under test, a difference can be obtained by comparing a reference voltage value and the average power or magnitude of the output signal of the corresponding analogue-to-digital converter.

$$V_{off} = V_{ref} - V_{out} \quad \text{equation (39)}$$

Where, $V_{ref}$ is the reference voltage value. Two thresholds th1 and th2 may be set according to the precision requirement of the measurement to ensure the effective number digits of the digital signal. If $V_{off}$<th1, then the total gain of all gain modules except the gain module under test is preferred to be decreased. If $V_{off}$>th2, then the total gain of all gain modules except the gain module under test is preferred to be increased. If th1≦$V_{off}$≦th2, the digital signal meets the requirement.

If the inequation (40) is right, the magnitude of the digital signal can be adjusted to be in the reference voltage range.

$$th1 \leq V_{off} - \sum_{i \in N \& i \neq i_0} (l_i * \Delta G_i) \leq th2 \quad \text{inequation (40)}$$

Where, $\Delta G_i$ is the gain step of the $i^{th}$ gain module. $l_i$ the number of steps to be adjusted. Under different testing conditions, the set of $l_i$ different. For example, a gain module has the following gain settings: 18 dB, 6 dB, −6 dB, and −18 dB. When it is set at 18 dB, the set of $l_i$ is {0, −1, −2, −3}. When it is set at 6 dB, then the set of $l_i$ is {1, 0, −1, −2}. To simplify calculation, it is preferred that the gain module under test only has one gain step. In other words, gain differences between each two adjacent gain settings of the gain module under test are same. In addition, to finish the adjustment as quickly as possible, it is preferred that different gain module may have different gain steps, and the gain resolution can be ensured by the smallest gain step. In one embodiment, gain steps of other gain modules are integer times of the smallest gain step. As a result, it will be easier to solve inequation (40), and it will be simpler to design the AGC table. In addition, for convenient adjustment, it is preferred that the dynamic range of the gain module having the smallest gain step is not less than the second smallest gain step.

For example, the gain step of low noise amplifier may be 16 dB, the gain step of mixer may be 8 dB, the gain steps of some intermediate frequency amplifiers and baseband amplifiers may be 32 dB, or 16 dB, or 8 dB, or 4 dB, and the smallest gain step may be 1 dB.

If the gain steps meet the above requirement, the adjustment can be conducted as following.

If $V_{off}$<th1, there may be peak clipping in digital-to-converter, as a result, the measured magnitude of the digital signal is not reliable, therefore the total gain is preferred to be decreased.

If $V_{off}$>th2, it is preferred to increase the total gain.

In one embodiment, it is preferred to adjust the gain setting of the gain module having the smallest gain step to correct the smallest remainder obtained by dividing the gain difference between the reference voltage and the output signal by gain steps. If the smallest remainder is still not compensated even the gain module having the smallest gain step is set at the highest gain setting, then the gain setting may be adjusted downward until the smallest remainder is equal to the second smallest gain step. In another embodiment, if the smallest remainder is still not compensated even the gain module having the smallest gain step is set at the highest gain setting, check whether a second gain module also having the smallest gain step is set at the highest gain setting. If not, the gain setting of the second gain module may be adjusted directly to compensate the smallest remainder. If yes, the gain setting of the second gain module may be adjusted downward until the smallest remainder is equal to the second smallest gain step, and then the gain setting of a gain module having the second smallest gain step may be adjusted to compensate the smallest remainder. Using the above method, the gain difference may be substantially compensated step by step. If inequation (40) is not satisfied even if all gain modules have been searched, then a signal indicating the error will be generated, and the voltage of the testing signal may be adjusted to address the problem. It is preferred that gain setting of the module under test is kept unchanged in the adjustment. It is preferred to try to avoid adjusting low noise amplifier and mixer in the adjustment too. An initial value of the total gain may be set according to the voltage of the testing signal to avoid adjustment of the voltage of the testing signal, and to simplify the adjustment.

Differences between measured gain steps and ideal gain steps correspondingly are to be corrected to accelerate the convergence of the AGC. Conventionally, the differences are corrected by adjusting corresponding gain modules individually, but it is too complicated. Since the purpose of correcting the differences is to ensure gain differences between different settings of the AGC table being substantially equal to specified values. In one embodiment, settings of the AGC table may be adjusted to achieve the same purpose, and it is much simpler. The AGC table may be updated when necessary.

The measurement of I/Q gain imbalance and I/Q phase imbalance may be performed when receiver is powered on, or may be performed in a time division duplex mode.

Figure 4:
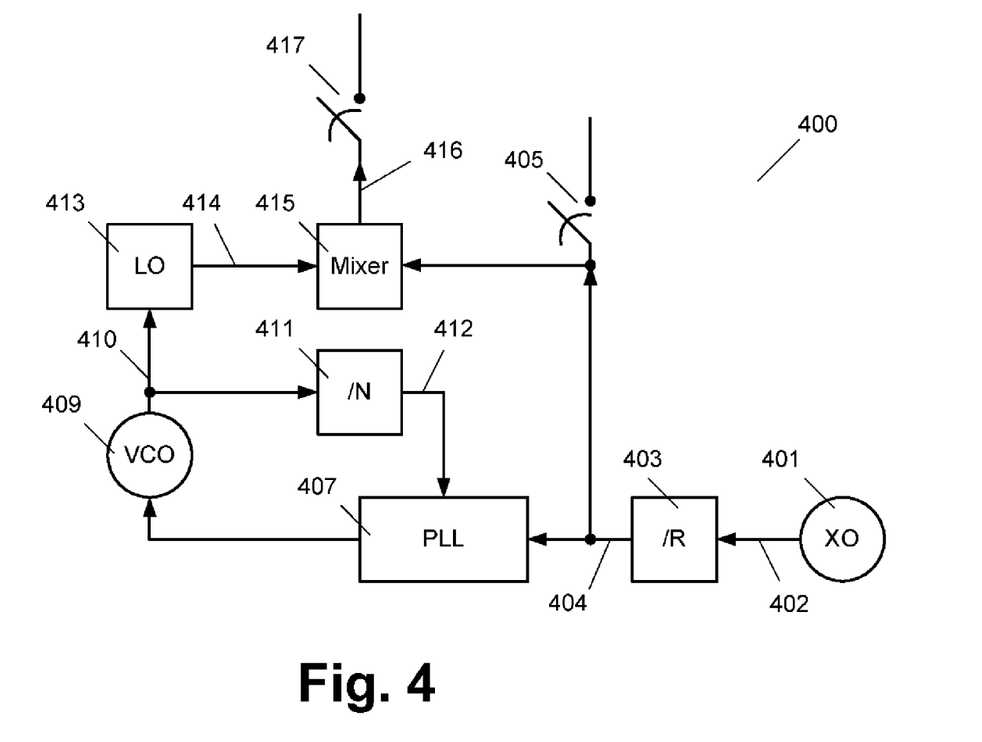
FIG. 4 illustrates a block diagram of a testing signal generator of one embodiment of the present application.

FIG. 4 illustrates a block diagram of testing signal generator 400. Testing signal generator 400 comprises crystal oscillator 401, reference frequency divider 403, switch 405, phase locked loop (PLL) 407, voltage controlled oscillator 409, loop frequency divider 411, local oscillator signal generator (LO) 413, mixer 415, and switch 417. The input and output of reference frequency divider 403 are connected with crystal oscillator 401 and PLL 407 respectively. Switch 405 is connected with the output of reference frequency divider 403. The input of voltage controlled oscillator 409 is connected with PLL 407, and the output of voltage controlled oscillator 409 is connected with loop frequency divider 411 and local oscillator signal generator 413. The output of local oscillator signal generator 413 is connected with the input of mixer 415. Switch 417 is connected with the output of mixer 415. Crystal oscillator 401 generates signal 402. Reference frequency divider 403 receives signal 402 and generates signal 404, which is a baseband signal and whose frequency is within wanted baseband signal bandwidth, by frequency dividing. If switch 405 is closed, signal 404 will be output as baseband testing signal. Signal 404 is processed by PLL 407 to keep its frequency stable. Voltage controlled oscillator 409 receives the signal processed by PLL 407 and generates signal 410. Loop frequency divider 411 receives signal 410 and generates signal 412 by frequency dividing. Signal 412 is used to calibrate PLL 407. Local oscillator signal generator 413 receives signal 410 and generates signal 414 which is a local oscillator signal. Mixer 415 receives and mixes signal 414 and signal 404 to generate signal 416 which is a radio frequency signal and whose frequency is within wanted radio frequency range. When switch 417 is closed, signal 416 will be output as a radio frequency testing signal. A conventional receiver includes most modules of testing signal generator 400 to generate local oscillator signals which are used to generate the I signal and the Q signal. In other words, the modules can be shared by testing signal generator 400 and a receiver to simplify the circuit and lower the cost. In one embodiment, testing signal generator 400 shares the following modules with a receiver to simplify the circuit, thus to lower the cost: crystal oscillator 401, reference frequency divider 403, PLL 407, voltage controlled oscillator 409, loop frequency divider 411, and oscillator signal generator (LO) 413. In one embodiment, signal 402 and signal 414 may be sine waves and may have wanted signal bandwidth.

In one embodiment, the range between the lowest gain setting and the highest gain setting of a gain module having the smallest gain step may be extended to cover the greatest possible gain deviation. As a result, the AGC table can be updated by only adjusting gain modules having the smallest gain step.

We claim:

1. A method for measuring parameters of a receiver, the receiver including a mixer for generating an I signal and a Q signal using an input signal, an I channel circuit for processing the I signal, and a Q channel circuit for processing the Q signal, the method comprising:
   feeding the receiver a first testing signal before the mixer;
   feeding the receiver a second testing signal on the I channel circuit;
   feeding the receiver a third testing signal on the Q channel circuit; and
   measuring I/Q quadrature deviation and I/Q delay imbalance of the receiver using the first, the second, and the third testing signals.

2. The method of claim 1, the method further comprising:
   sampling on the I channel circuit to obtain a first I signal corresponding to the first testing signal;
   sampling on the Q channel circuit to obtain a first Q signal corresponding to the first testing signal;
   sampling on the I channel circuit to obtain a second I signal corresponding to the second testing signal;
   sampling on the Q channel circuit to obtain a second Q signal corresponding to the third testing signal;
   calculating the I/Q quadrature deviation and the I/Q delay imbalance using the first I signal, the first Q signal, the second I signal, and the second Q signal.

3. The method of claim 2, the method further comprising:
   calculating a first I/Q phase imbalance using the first I signal and the first Q signal;
   calculating a second I/Q phase imbalance using the second I signal and the second Q signal; and
   calculating the I/Q quadrature deviation and the I/Q delay imbalance using the first and the second I/Q phase imbalance.

4. The method of claim 2, wherein the first I signal, the first Q signal, the second I signal, and the second Q signal are digital signals.

5. The method of claim 2, wherein
   the I channel circuit includes a first low pass filter, the first I signal is sampled at a first position on the I channel circuit before the first low pass filter, the second testing signal is fed at the first position,
   the Q channel circuit includes a second low pass filter, the first Q signal is sampled at a second position on the Q channel circuit before the second low pass filter, the third testing signal is fed at the second position,
   the position of the first position along the I channel circuit is corresponding with the position of the second position along the Q channel circuit,
   the second I signal is sampled at the output of the I channel circuit, the second Q signal is sampled at the output of the Q channel circuit.

6. The method of claim 1, the method further comprising:
   generating the first testing signal using a local generated signal which is used to generate a local oscillator signal;
   generating the second testing signal using the local generated signal; and
   generating the third testing signal using the local generated signal.

7. The method of claim 1, wherein the first testing signal is a radio frequency signal, and the second and the third testing signals are baseband signals.

8. The method of claim 1, wherein the second testing signal and the third testing signal are the same signal.

9. The method of claim 1, the method further comprising:
measuring a step deviation of at least one gain module of the receiver using the first testing signal; and
calibrating gain settings of an automatic gain control table according to the step deviation of the at least one gain module.

10. A receiver comprising:
a mixer for generating an I signal and a Q signal using an input signal; an I channel circuit for processing the I signal; a Q channel circuit for processing the Q signal;
a first testing signal generating circuit for generating a first testing signal being connected to the signal path before the mixer;
a second testing signal generating circuit for generating a second testing signal being connected to the channel circuit;
a third testing signal generating circuit for generating a third testing signal being connected to the Q channel circuit; and
a digital signal processor for measuring I/O quadrature deviation and I/O delay imbalance using the first, the second, and the third testing signals.

11. The receiver of claim 10, wherein:
the I channel circuit comprises a first low pass filter, the second testing signal generating circuit is connected to the I channel circuit at a first position before the first low pass filter;
the Q channel circuit comprising a second low pass filter, the third testing signal generating circuit is connected to the Q channel circuit at a second position before the second low pass filter;
the position of the first position along the I channel circuit is corresponding with the position of the second position along the Q channel circuit.

12. The receiver of claim 11, further comprising:
a first bypass circuit connected to the I channel circuit at the first position; and
a second bypass circuit connected to the Q channel circuit at the second position.

13. The receiver of claim 10, wherein the first testing signal generating circuit generates the first testing signal using a local generated signal which is used to generate a local oscillator signal, the second testing signal generating circuit generates the second testing signal using the local generated signal, and the third testing signal generating circuit generates the third testing signal using the local generated signal.

14. The receiver of claim 10, wherein the first testing signal is a radio frequency signal, the second testing signal and the third testing signal are baseband signals.

15. The receiver of claim 10, wherein the second testing signal generating circuit and the third testing signal generating circuit are the same circuit.

16. A communication system, comprising:
a receiver comprising a signal path, the signal path comprising a mixer for generating an I signal and a Q signal using an input signal, an I channel circuit for processing the I signal, and a Q channel circuit for processing the Q signal;
a first testing signal generating circuit for generating a first testing signal being connected to the signal path before the mixer;
a second testing signal generating circuit for generating a second testing signal being connected to the I channel circuit;
a third testing signal generating circuit for generating a third testing signal being connected to the Q channel circuit; and
a demodulator comprising a digital signal processor for measuring I/Q quadrature deviation and I/Q delay imbalance using the first, the second, and the third testing signals in testing mode, and for demodulating in working mode.

17. The communication system of claim 16, wherein:
the I channel circuit comprises a first low pass filter, the second testing signal generating circuit is connected to the I channel circuit at a first position before the first low pass filter;
the Q channel circuit comprising a second low pass filter, the third testing signal generating circuit is connected to the Q channel circuit at a second position before the second low pass filter,
the position of the first position along the I channel circuit is corresponding with the position of the second position along the Q channel circuit.

18. The communication system of claim 17, further comprising:
a first bypass circuit connected to the I channel circuit at the first position; and
a second bypass circuit connected to the Q channel circuit at the second position.

19. The communication system of claim 16, wherein the first testing signal generating circuit generates the first testing signal using a local generated signal which is used to generate a local oscillator signal, the second testing signal generating circuit generates the second testing signal using the local generated signal, and the third testing signal generating circuit generates the third testing signal using the local generated signal.

20. The communication system of claim 15, wherein the first testing signal is a radio frequency signal, the second testing signal and the third testing signal are baseband signals.

* * * * *